United States Patent [19]

Ushioda et al.

[11] Patent Number: 4,464,503

[45] Date of Patent: Aug. 7, 1984

[54] POROUS PARTICULATE POLYVINYL CHLORIDE IMPREGNATED WITH ALKYL VINYL AND ALKYL METHACRYLATE POLYMERS

[75] Inventors: Minoru Ushioda, Amagasaki; Kenji Ueno, Takasago; Masahiro Kobayashi, Amagasaki, all of Japan

[73] Assignee: Kanegafuchi Kagaku Kogyo Kabushiki Kaisha, Osaka

[21] Appl. No.: 358,890

[22] Filed: Mar. 17, 1982

[30] Foreign Application Priority Data

Mar. 20, 1981 [JP] Japan .................................. 56-40826

[51] Int. Cl.$^3$ ........................................... C08F 259/04
[52] U.S. Cl. .................................... 524/425; 524/533; 525/309; 525/311
[58] Field of Search ................ 525/309, 311; 524/533, 524/425

[56] References Cited

U.S. PATENT DOCUMENTS

| | | | |
|---|---|---|---|
| 3,658,943 | 4/1972 | Field et al. ........................... | 525/309 |
| 3,903,198 | 9/1975 | Wei ...................................... | 525/309 |
| 3,928,500 | 12/1975 | Kraft et al. ........................... | 525/309 |

FOREIGN PATENT DOCUMENTS 1093974 11/1966 United Kingdom ................ 525/311

*Primary Examiner*—Wilbert J. Briggs, Sr.
*Attorney, Agent, or Firm*—Armstrong, Nikaido, Marmelstein & Kubovcik

[57] ABSTRACT

A particulate vinyl chloride polymer having excellent processability and heat stability which comprises porous vinyl chloride polymer particles and alkyl vinyl polymers which are included in the porous particles. The particulate polymer is prepared by impregnating an alkyl vinyl compound in porous particles of a vinyl chloride polymer, polymerizing it, and in the course of the polymerization of the alkyl vinyl compound, adding an alkyl methacrylate to the polymerization system and continuing the polymerization. Since the thus obtained polymer has an improved melt-flowability and heat stability, it can be blended with a large quantity of an inorganic filler and can be molded with good processability.

7 Claims, No Drawings

POROUS PARTICULATE POLYVINYL CHLORIDE IMPREGNATED WITH ALKYL VINYL AND ALKYL METHACRYLATE POLYMERS

BACKGROUND OF THE INVENTION

The present invention relates to an improved vinyl chloride polymer having excellent processability and physical properties, and more particularly to a particulate vinyl chloride polymer composition having improved flowability and heat stability and capable of providing moldings having excellent heat resistance, rigidity and impact resistance, and a process for the preparation thereof.

Polyvinyl chloride has excellent chemical and mechanical properties and is inexpensive, and therefore it has been employed industrially in large quantities. However, since the polyvinyl chloride is poor in processability and heat stability, and since the processing temperature is close to the thermal decomposition temperature, it is difficult to adopt a manner such as lowering a melt viscosity of the polymer at high temperatures like ordinary resins and the polyvinyl chloride has had to be processed in the state that the flowability is low. In particular, in case of admixing the polyvinyl chloride with large quantities of an inorganic filler for imparting the rigidity and heat resistance to the obtained moldings or for cost down, the processability and heat stability are remarkably lowered and the molding becomes impossible.

It is known to use a polyvinyl chloride having a low degree of polymerization in order to improve the molding processability, especially flowability. However, a polyvinyl chloride having a low degree of polymerization has the defects that not only it is poor in heat stability, but also it causes the lowering of impact resistance and tensile strength. Also, in order to improve the molding processability, it is proposed to copolymerize vinyl chloride with a comonomer such as an alkyl acrylate or an alkyl vinyl ether. However, such a vinyl chloride copolymer has the defect that the heat stability of the polymer or the heat resistance and tensile strength of the obtained moldings are lowered, though the melt viscosity is lowered by the copolymerization of the comonomer and whereby the flowability is improved. Besides, it is known to add a plasticizer and a lubricant to polyvinyl chloride for improving the molding processability. However, the addition thereof in large quantities is required in obtaining a sufficient flowability, and it causes problems that the heat resistance and rigidity are lowered, gelation is ununiform or insufficient and bleeding takes place.

SUMMARY OF THE INVENTION

It is an object of the present invention to provide an improved vinyl chloride polymer having excellent processability and heat stability.

A further object of the invention is to provide a particulate vinyl chloride polymer which has improved melt-flowability and heat stability and which is particularly suitable for blending with large quantities of inorganic fillers and is capable of providing molded articles having excellent physical properties, e.g. heat resistance, rigidity and impact resistance.

Another object of the invention is to provide a process for preparing an improved vinyl chloride polymer having excellent processability and heat stability.

These and other objects of the present invention will become apparent from the description hereinafter.

It has now been found that the above-mentioned objects can be attained by producing polymers of specified monomers in previously formed porous particles of a vinyl chloride polymer so that the produced polymers are included in the porous particles.

Accordingly, in accordance with the present invention, there is provided a particulate vinyl chloride polymer composition which comprises porous particles of a vinyl chloride polymer and 2 to 20 parts by weight of, per 100 parts by weight of the vinyl chloride polymer, a polymer mixture of a polymer of (a) an alkyl vinyl monomer having a $C_4$ to $C_{18}$ alkyl group selected from the group consisting of an alkyl vinyl ether and a fatty acid vinyl ester, a polymer of (b) an alkyl methacrylate having a $C_1$ to $C_4$ alkyl group and a copolymer of said alkyl vinyl monomer (a) and said alkyl methacrylate (b), the weight ratio of the component (a) to the component (b) in said polymer mixture being from 90/10 to 60/40 and said porous particles being substantially filled with said polymer mixture.

The particulate vinyl chloride polymer composition of the invention having excellent processability and heat stability is prepared by impregnating porous vinyl chloride polymer particles with the alkyl vinyl monomer, polymerizing it, and adding and polymerizing the alkyl methacrylate, while the polymerization of the alkyl vinyl monomer is in progress. A blend of the particulate vinyl chloride polymer composition of the invention, namely a vinyl chloride polymer powder containing the alkyl vinyl polymers, and an inorganic filler with or without other additives for vinyl chloride polymers has improved melt-flowability and heat stability and provides molded articles having excellent heat resistance and physical properties.

DETAILED DESCRIPTION

In the present invention, it is necessary to conduct the two stage polymerization where an alkyl vinyl monomer is first impregnated and polymerized in porous particles of a vinyl chloride polymer, and in the course of the polymerization of the alkyl vinyl monomer, an alkyl methacrylate is then added to the polymerization system and is polymerized. In the case where an alkyl vinyl ether is impregnated and polymerized in the porous vinyl chloride polymer particles and the thus obtained powder is then blended with an alkyl methacrylate homopolymer or copolymer which is known as an improver of the processability, it is observed that the melt-flowability is rather lowered. When the two stage polymerization of the alkyl vinyl compound and the alkyl methacrylate is conducted according to the present invention, the melt-flowability of vinyl chloride polymers is remarkably improved as compared with the above vinyl chloride polymers obtained by the impregnation and polymerization of only the alkyl vinyl ether followed by blending with alkyl methacrylate polymers. Also, the powder obtained by impregnating and polymerizing a monomer mixture of the alkyl vinyl ether and the alkyl methacrylate in the porous vinyl chloride polymer particles has an improved melt-flowability, but is poor in impact resistance.

Like this, the particulate vinyl chloride polymer of the present invention is excellent in heat stability as well as melt-flowability, and accordingly it is very useful particularly for the cases where a large quantity of an inorganic filler is employed for the purpose of improving physical properties such as heat resistance and rigidity or decreasing in cost.

Vinyl chloride polymers (hereinafter referred to as "PVC") used in the present invention include vinyl chloride homopolymer and copolymers of vinyl chloride and other copolymerizable monomers, e.g. vinyl acetate, ethylene, propylene and vinylidene chloride. In case of the copolymers, those containing at least 75% by weight of the vinyl chloride component are preferable. The PVC may be those obtained by post-chlorination. The degree of the polymerization of PVC is not particularly limited, and is suitably selected according to the uses and purposes. For instance, in case of using the product of the present invention in the field setting importance on the melt-flowability such as injection molding, PVC having a degree of polymerization of 300 to 800 is preferred. In case of setting importance on mechanical characteristics as required in structures produced by extrusion, PVC having a degree of polymerization of not less than 800 is preferred.

It is necessary that the PVC particles used in the present invention have a porous structure. The PVC particles prepared by known suspension or bulk polymerization methods are preferably employed as starting porous PVC particles. In general, the PVC particles having a particle size of 30 to 150 μm., especially 100 to 150 μm., are employed as a starting material in the present invention. Also, it is preferable that the pore diameter of the PVC particles is from about 0.15 to about 16 μm. and the volume of pores in the particles is from 2 to 100 ml./100 g. PVC, especially 3 to 50 ml./100 g. PVC.

The alkyl vinyl polymers produced by the impregnation and polymerization of an alkyl vinyl compound and an alkyl methacrylate are a mixture of a polymer of an alkyl vinyl ether and/or a fatty acid vinyl ester, an alkyl methacrylate homopolymer and a copolymer of the alkyl vinyl ether and/or the fatty acid vinyl ester with the alkyl methacrylate. The amount of the alkyl vinyl polymer component included in the product of the present invention is from 2 to 20 parts by weight per 100 parts by weight of PVC. When the amount is less than 2 parts by weight, the flowability is not improved, and when the amount is more than 20 parts by weight, the heat stability and heat resistance is lowered, and in addition, the dispersibility of an inorganic filler into the improved PVC of the invention is lowered. It is also necessary that the weight ratio of the alkyl vinyl compound component to the alkyl methacrylate component in the produced alkyl vinyl polymer as a whole is from 90/10 to 60/40. When the ratio is outside the above range, improvement of the flowability is a little.

The alkyl vinyl compounds having a $C_4$ to $C_{18}$ alkyl group, preferably a $C_6$ to $C_{18}$ alkyl group, are employed as first stage monomers in the present invention. When the carbon number of the alkyl group is less than 4, improvement of the flowability is a little. When the carbon number of the alkyl group is not less than 4, especially not less than 6, the effect on the improvement of flowability is remarkably increased, and exhibited particularly in the case where the product of the invention is blended with a large quantity of an inorganic filler. Examples of the alkyl vinyl compound are fatty acid vinyl esters such as vinyl caprylate, vinyl caprate, vinyl laurate, vinyl palmitate and vinyl stearate; and alkyl vinyl ethers such as butyl vinyl ether, octyl vinyl ether, lauryl vinyl ether, cetyl vinyl ether, octadecyl vinyl ether and stearyl vinyl ether. These alkyl vinyl compounds may be employed alone or in admixture thereof. The alkyl vinyl compounds may also be employed, as occasion demands, in admixture with an equal or less amount of other polymerizable monomers such as vinyl acetate, ethyl vinyl ether, styrene and acrylonitrile.

Examples of the alkyl methacrylates having a $C_1$ to $C_4$ alkyl group employed in the present invention are, for instance, methyl ester, ethyl ester, propyl ester and butyl ester of methacrylic acid. The alkyl methacrylates may be employed alone or in admixture thereof.

In the preparation of the improved particulate PVC of the present invention, usual polymerization processes such as suspension polymerization, bulk polymerization and gas phase polymerization are adoptable. Suspension polymerization process which has been industrially, widely utilized is convenient. For instance, the improved particulate PVC of the invention is prepared by suspension polymerization as follows: The porous PVC particles are dispersed into water to form a slurry. The ratio of the PVC particles to water is usually form 1/1 to 1/10 by weight. A mixture of a fatty acid vinyl ester monomer and an oil-soluble radical polymerization initiator which may further contain a chain transfer agent is added to the slurry, and impregnated in the porous PVC particles at a temperature that the polymerization does not substantially proceed. The impregnation is usually carried out by agitating the slurry in nitrogen stream for 20 to 120 minutes. The temperature of the polymerization system is then raised to start the polymerization. It is desirable to carry out the polymerization at a temperature of 50° to 100° C., especially 60° to 90° C., in points of the polymerization rate and the deterioration of PVC. An alkyl methacrylate monomer is added to the polymerization system in the course of the polymerization of the fatty acid vinyl ester monomers, preferably when the polymerization conversion of the vinyl ester monomer is from 50 to 90% by weight. The polymerization is further continued, usually for 0.5 to 5 hours. A polymerization initiator and a chain transfer agent may be additionally employed, or those remaining in the system without being consumed in the polymerization of the fatty acid vinyl ester may be utilized.

When only an alkyl vinyl ether is employed as a first stage monomer and the polymerization is carried out by the above-mentioned suspension polymerization process, the polymerization rate is very slow and it is hard to obtain a high conversion. Therefore, in case of employing only the alkyl vinyl ether as a first stage monomer, it is desirable to conduct the polymerization in the first stage by a bulk or solution polymerization process using a cationic polymerization initiator. For instance, sufficiently dehydrated porous PVC particles are dispersed in an organic solvent which does not dissolve PVC, e.g. aromatic hydrocarbons, halogenated aliphatic hydrocarbons and aliphatic hydrocarbons, and the alkyl vinyl ether is added to the dispersion and is sufficiently impregnated in the porous particles. The ratio of the PVC particles to the organic solvent is usually from 1/1 to 1/10 by weight. The cationic polymerization initiator is then added to the dispersion and the polymerization is carried out at a temperature of from −80° C. to room temperature. When the polymerization conversion of the alkyl vinyl ether reaches 50 to 90% by weight, an alkyl methacrylate is added to the polymerization system to conduct the second stage polymerization. The second stage polymerization may be conducted by either ionic polymerization or radical polymerization. For instance, in case of conducting the suspension polymerization, the solvent is removed by evaporation, and water, an alkyl methacrylate and an oil-soluble initiator are added to the polymerization system. Water is usually employed in an amount of 1 to 10 parts by weight per 1 part of the PVC particles used. The polymerization is further continued, usually for 0.5 to 5 hours.

Oil-soluble radical polymerization initiators are employed as radical polymerization initiators, e.g. known peroxides, azo compounds and redox catalysts consisting of oil-soluble hydroperoxides and reducing agents. In particular, there is preferred a combined initiator system of an oil-soluble peroxide having a 10 hour half-life temperature of not more than 50° C. and a chain transfer agent. The term "10 hour half-life temperature" as used herein means the temperature at which 10 hours are required in reducing the concentration of an initiator by half by the thermal decomposition. The oil-soluble peroxide having a 10 hour half-life temperature of not more than 50° C. has a very high catalytic activity, and by the use thereof, it is possible to increase the polymerizability of the vinyl monomers and to attain a high polymerization conversion. On the other hand, however, there are cases where a large quantity of the gelled portion insoluble in tetrahydrofuran is produced in the formed alkyl vinyl polymers, and as a result, the melt-flowability of the obtained product is impaired and the processability cannot be improved. The use of the oil-soluble peroxide having a 10 hour half-life temperature of not more than 50° C. in combination with a chain transfer agent can inhibit the production of the gelled portion, so the improved particulate PVC having excellent melt-flowability and heat stability can be obtained. Examples of the oil-soluble peroxide having a 10 hour half-life temperature of not more than 50° C. are peresters such as acetyl cyclohexylsulfonyl peroxide, acetyl sec-heptylsulfonyl peroxide and tert-butyl peroxyneodecanoate; diacyl peroxides such as di-isobutyryl peroxide; peroxydicarbonates such as di-isopropyl peroxydicarbonate, di-n-propyl peroxydicarbonate, di-2-ethoxyethyl peroxydicarbonate, di-methoxyisopropyl peroxydicarbonate, di-2-ethylhexyl peroxydicarbonate, di-isobutyl peroxydicarbonate, bis(4-tert-butylcyclohexyl)peroxydicarbonate and di-3-methoxybutyl peroxydicarbonate; and the like. The amount of such an oil-soluble peroxide used varies depending on the polymerization temperature and other conditions, and is usually selected from 0.1 to 10% by weight based on the total weight of the monomers used.

Lewis acids and proton acids are employed as cationic initiators, e.g. sulfur dioxide, stannous chloride, aluminum chloride, ferric sulfate, boron fluoride and boron fluoride diethyl etherate.

Various compounds known as chain transfer agents can be employed in the present invention. Typical examples of the chain transfer agent are, for instance, mercaptans such as butyl mercaptan, n-dodecyl mercaptan, tert-dodecyl mercaptan, mercaptoethanol, mercaptopropanol, thioglycollic acid, methylthioglycollic acid and thiolactic acid; and olefins such as dichloroethylene, trichloroethylene, 2,4,-diphenyl-4-methyl-1-pentene (i.e. dimer of α-methylstyrene) and terpinen (i.e. trimer of isoprene). The amount of the chain transfer agent varies somewhat depending on the kind thereof, the kind and amount of the oil-soluble peroxide used in combination therewith and the polymerization conditions such as temperature. In general, the chain transfer agent is employed in an amount of 0.1 to 10% by weight based on the total amount of the monomers used.

After the completion of the polymerization, the product is recovered in a usual manner. The improved particulate PVC so obtained has a particle size of 50 to 200 μm. The polymerization of the monomers almost takes place inside the PVC particles, and the produced alkyl vinyl polymers are substantially included in the PVC particles. It is scarcely observed that the vinyl polymers, e.g. a polymer containing methacrylate units, are produced on the surface of the PVC particles. The improved PVC of the present invention has excellent melt-flowability and heat stability, and accordingly the processability is very good. The melt-flowability may be estimated by the flow rate of a molten resin. The flow rate as shown herein refers to a value measured by employing a flow tester of Koka type (made by Simadzu Corporation) having a nozzle of 1 mm. in diameter and 10 mm. in length under conditions of 210° C. in temperature and 100 kg./cm.$^2$ in loading. The flow rate of the improved PVC of the invention usually falls within the range of $5 \times 10^{-2}$ to $20 \times 10^{-2}$ ml./sec., though it varies depending on the degree of polymerization of the PVC used as a starting material. In general, when PVC is blended with inorganic fillers, the heat stability is remarkably lowered. The improved PVC of the invention has an improved heat stability and can be blended with a large quantity of inorganic fillers without causing problems in molding.

Since the improved PVC of the invention has a high melt-flowability and an excellent heat stability, it can be blended with a large quantity of an inorganic filler to provide a molding composition which is moldable with good processability. The inorganic fillers to be blended with the improved PVC of the present invention include, for instance, barium carbonate, barium sulfate, calcium carbonate, gypsum, clay, talc, mica, calcium silicate, titanium dioxide, carbon black, graphite, wollastonite, asbestos, glass fiber, carbon fiber, various metal powders and whisker. The filler is usually employed in an amount of 2 to 100 parts by weight per 100 parts by weight of the improved PVC of the invention. When the amount of the filler is less than 2 parts by weight, effects to be produced by the addition of the filler are hard to be obtained. When the amount of the filler is more than 100 parts by weight, the melt-flowability of the composition is remarkably lowered.

Other additives which are usually employed in processing of PVC, e.g. heat stabilizer, antioxidant, ultraviolet absorbent, plasticizer, lubricant, pigment, improver for processability and improver for impact resistance, may be suitably employed as well as the inorganic filler in processing the improved PVC of the present invention. A blend of the improved PVC and an inorganic filler, and if necessary, further with other additives is processed in a usual manner. For instance, the improved PVC is blended with an additive by roll mill, Bumbury's mixer, etc. and molded by extruder, injection molding machine, etc.

The present invention is more specifically described and explained by means of the following Examples, in which all % and parts are by weight. It is to be understood that the present invention is not limited to the Examples and various changes and modifications may be made in the invention without departing from the spirit and scope thereof.

In the following Examples, the heat deformation temperature was measured according to ASTM-D-648 (loading: 18.6 kg./cm.$^2$), and the impact strength was measured according to ASTM-D-256 (¼ inch bar, notched).

Also, the heat stability was estimated as follows: A PVC blend is kneaded by a Brabender plastograph at 180° C. in chamber temperature and 60 r.p.m. in number of rotation of screw. The torque rises, reaches the steady state (steady torque) and thereafter further rises. There is measured the time from starting the kneading to the point at which the torque rises by 0.1 m.-kg. from the steady torque.

EXAMPLES 1 TO 6

The resin/water ratio in a PVC slurry which was obtained by a usual suspension polymerization and in which the PVC had an average degree of polymerization of about 500, was adjusted to ½ by weight. To the slurry was added at room temperature a mixture of, per 100 parts of PVC, 6 parts of vinyl caprate, 0.18 part of bis(4-t-butylcyclohexyl)peroxydicarbonate (commercial name "Perkadox 16" made by Kayaku Noury Corporation) (hereinafter referred to as "PKD") and 0.04 part of mercaptoethanol (made by Wako Pure Chemical Industries, Ltd.) The slurry was agitated in nitrogen stream at room temperature for 30 minutes to impregnate the mixture in the PVC particles. The temperature of the system was then elevated to 75° C. to start the polymerization. After 1.5 hours from the elevation of the temperature, the polymerization conversion of the acrylate reached 70%. At that point of time, a mixture of 2 parts of methyl methacrylate and 0.03 part of PKD was added to the system, and polymerization was further continued for 1.5 hours. The slurry was dehydrated and dried in a usual manner to give an improved PVC powder.

Also, the above procedure was repeated except that vinyl laurate was employed instead of vinyl caprate to give an improved PVC powder.

To 100 parts of each of the above improved PVC were added 0, 30 or 60 parts of calcium carbonate (commercial name "SSB" made by Shiraishi Calcium Kaisha Ltd.), 3 parts of dibutyl tin maleate, 1 part of dibutyl tin mercaptide, 0.5 part of butyl stearate and 2 parts of a low molecular weight polyethylene wax. They were blended at an elevated temperature by a high speed mixer. The blend was pelletized at 180° C. by a single-screw extruder, and was then molded at 210° C. by an injection molding machine to give specimens for measurement. With respect to the blends and the moldings obtained therefrom, the melt-flowability, the heat stability and the heat deformation temperature were measured.

The results are shown in Table 1.

COMPARATIVE EXAMPLES 1 TO 3

The molding was carried out in the same manner as in the preceding Examples except that a PVC having an average degree of polymerization of about 500 was blended with the additives.

The results are shown in Table 1.

COMPARATIVE EXAMPLES 4 TO 6

The polymerization and molding were carried out in the same manner as in the preceding Examples except that vinyl acetate was employed instead of vinyl caprate.

The results are shown in Table 1.

TABLE 1

| | Fatty acid vinyl ester | Amount of CaCO$_3$ (part) | Flow rate ($10^{-2}$ ml./sec.) | Heat deformation temp. (°C.) | Heat stability (min.) |
|---|---|---|---|---|---|
| Ex. 1 | Vinyl caprate | 0 | 13.0 | 57 | 9.0 |
| Ex. 2 | Vinyl caprate | 30 | 3.6 | 57 | 6.0 |
| Ex. 3 | Vinyl caprate | 60 | 1.2 | 59 | 3.5 |
| Ex. 4 | Vinyl laurate | 0 | 13.5 | 57 | 10.0 |
| Ex. 5 | Vinyl laurate | 30 | 4.0 | 57 | 6.2 |
| Ex. 6 | Vinyl laurate | 60 | 1.2 | 59 | 3.5 |
| Com. Ex. 1 | — | 0 | 6.8 | 60 | 7.0 |
| Com. Ex. 2 | — | 30 | 1.5 | 62 | 4.0 |
| Com. Ex. 3 | — | 60 | 0.3 | 63 | — |
| Com. Ex. 4 | Vinyl acetate | 0 | 12.5 | 58 | 8.0 |
| Com. Ex. 5 | Vinyl acetate | 30 | 2.4 | 57 | 5.0 |
| Com. Ex. 6 | Vinyl acetate | 60 | 0.5 | 58 | — |

As is clear from Table 1, PVC modified by the two stage impregnation-polymerization using vinyl caprate or vinyl laurate as a fatty acid vinyl ester is largely improved in melt-flowability without lowering the heat reistance. On the other hand, in case of using vinyl acetate as a fatty acid vinyl ester, the lowering of the flowability is large when the product is blended with calcium carbonate.

EXAMPLE 7 AND COMPARATIVE EXAMPLES 7 TO 9

The procedures of Example 5 were repeated except that the kind or amount of the first and second stage monomers was changed as shown in Table 2.

The results are shown in Table 2 together with the results for Example 5.

TABLE 2

|  | Monomer in 1st stage (part) | | Monomer in 2nd stage (part) | Characteristics | | |
|---|---|---|---|---|---|---|
|  | Vinyl laurate | Methyl methacrylate | Methyl methacrylate | Flow rate ($10^{-2}$ ml./sec.) | Heat deformation temp. (°C.) | Impact strength (kg cm./cm.$^2$) |
| Ex. 5 | 6 | — | 2 | 4.0 | 57 | 4.8 |
| Ex. 7 | 8 | — | 2 | 5.2 | 55 | 5.8 |
| Com. Ex. 7 | 6 | — | — | 2.5 | 58 | 1.5 |
| Com. Ex. 8 | 6 | 2 | — | 4.0 | 57 | 2.8 |
| Com. Ex. 9 | 6 | — | 6 | 2.9 | 58 | 1.2 |

As is clear from Table 2, the products of Comparative Examples where an alkyl methacrylate is not employed or is employed in an amount outside the range of the invention or a mixture of a vinyl ester and an alkyl methacrylate is employed, and the impregnation and polymerization are conducted in one stage, are low in flowability and impact strength as compared with the improved PVC of the present invention.

EXAMPLES 8 TO 10

Suspension polymerization of vinyl chloride was carried out in a usual manner, and porous particles of PVC having an average degree of polymerization of 500 was obtained from the slurry and was dried at 50° C. for a whole day and night to sufficiently remove water. Air in the flask was replaced with nitrogen, and 100 parts of the PVC particles, 20 parts of liquefied propane and 6 parts of isooctyl vinyl ether were added to the flask cooled on a dry ice-methanol bath and were agitated for 30 minutes in nitrogen atmosphere to impregnate the PVC particles with isooctyl vinyl ether. To the flask was added 0.18 part of boron trifluoride diethyl etherate. After agitating for 1 hour, propane was evaporated to remove, while adding 200 parts of water.

To the reaction mixture were added 2 parts of methyl methacrylate and 0.07 part of PDK, and the polymerization was further continued at 75° C. for 1.5 hours. The resulting slurry was dehydrated and dried in a usual manner to give an improved PVC powder.

By employing the thus obtained improved PVC powder, the molding was carried out in the same manner as in Examples 1 to 6.

The results are shown in Table 3.

COMPARATIVE EXAMPLES 10 TO 12

The procedure of Examples 8 to 10 was repeated except that ethyl vinyl ether was employed instead of isooctyl vinyl ether.

The results are shown in Table 3.

isooctyl vinyl ether as a first stage monomer. On the other hand, in case of using vinyl ether as a first stage monomer, the lowering of the flowability is large when the product is blended with calcium carbonate.

In addition to the ingredients used in the Examples, other ingredients can be used in the Examples as set forth in the specification to obtain substantially the same results.

What we claim is:

1. A particulate vinyl chloride polymer composition which comprises porous particles of a vinyl chloride polymer and 2 to 20 parts by weight of, per 100 parts by weight of said vinyl chloride polymer, a polymer mixture of alkyl vinyl polymers produced by impregnating and polymerizing an alkyl vinyl compound and then an alkyl methacrylate in the presence of said porous particles, said alkyl vinyl polymers being a polymer of (a) a fatty acid vinyl ester monomer having a $C_4$ to $C_{18}$ alkyl group, a polymer of (b) an alkyl methacrylate having a $C_1$ to $C_4$ alkyl group and a copolymer of said fatty acid vinyl ester (a) and said alkyl methacrylate (b), the weight ratio of said component (a) to said component (b) in said polymer mixture being from 90/10 to 60/40 and said porous particles being substantially filled with said polymer mixture.

2. A process for preparing a particulate vinyl chloride polymer composition which comprises the steps of impregnating porous particles of a vinyl chloride polymer with a fatty acid vinyl ester monomer having a $C_4$ to $C_{18}$ alkyl group, polymerizing said fatty acid vinyl ester monomer, adding an alkyl methacrylate having a $C_1$ to $C_4$ alkyl group to the polymerization system in the course of said polymerization of said fatty acid vinyl ester monomer, and continuing said polymerization, the total amount of said fatty acid vinyl ester monomer and said alkyl methacrylate being 2 to 20 parts by weight per 100 parts by weight of said vinyl chloride polymer, and the weight ratio of said fatty acid vinyl ester monomer to said alkyl methacrylate being from 90/10 to 60/40.

TABLE 3

|  | Alkyl vinyl ether | Amount of CaCO$_3$ (part) | Flow rate ($10^{-2}$ ml./sec.) | Heat deformation temp. (°C.) | Heat stability (min.) |
|---|---|---|---|---|---|
| Ex. 8 | Isooctyl vinyl ether | 0 | 19.0 | 55 | 16.0 |
| Ex. 9 | " | 30 | 5.6 | 57 | 7.0 |
| Ex. 10 | " | 60 | 1.5 | 57 | 3.8 |
| Com. Ex. 10 | Ethyl vinyl ether | 0 | 18.2 | 55 | 15.0 |
| Com. Ex. 11 | " | 30 | 3.6 | 56 | 6.0 |
| Com. Ex. 12 | " | 60 | 0.8 | 59 | — |

As is clear from Table 3, the melt-flowability of PVC is remarkably improved without lowering the heat resistance by the two stage polymerization manner using 3. The process of claim 2, wherein said alkyl methacrylate is added to the polymerization system at the time when the polymerization conversion of said fatty acid vinyl ester monomer is from 50 to 90% by weight.

4. A polyvinyl chloride mixture comprising a particulate vinyl chloride polymer composition and 2 to 100 parts by weight of an inorganic filler per 100 parts by weight of the composition, said particulate vinyl chloride polymer composition comprising porous particles of a vinyl chloride polymer and 2 to 20 parts by weight of, per 100 parts by weight of said vinyl chloride polymer, a polymer mixture of alkyl vinyl polymers produced by impregnating and polymerizing an alkyl vinyl compound and then an alkyl methacrylate in the presence of said porous particles, said alkyl vinyl polymers being a polymer of a fatty acid vinyl ester monomer having a $C_4$ to $C_{18}$ alkyl group, a polymer of an alkyl methacrylate having a $C_1$ to $C_4$ alkyl group and a copolymer of said fatty acid vinyl ester monomer and said alkyl methacrylate, the weight ratio of said fatty acid vinyl ester monomer component to said alkyl methacrylate component in said polymer mixture being from 90/10 to 60/40 and said porous particles being substantially filled with said polymer mixture.

5. The mixture of claim 4, wherein said inorganic filler is calcium carbonate.

6. A particulate modified vinyl chloride polymer prepared by a process which comprises: (1) impregnating porous particles of a vinyl chloride polymer with a fatty acid vinyl ester having a $C_4$ to $C_{18}$ alkyl group, (2) polymerizing the fatty acid vinyl ester, (3) adding an alkyl methacrylate having a $C_1$ to $C_4$ alkyl group to the polymerization system in the course of said polymerization of said fatty acid vinyl ester, and (4) continuing said polymerization, the total amount of said fatty acid vinyl ester and said alkyl methacrylate being 2 to 20 parts by weight per 100 parts by weight of said porous particles, and the weight ratio of said fatty acid vinyl ester to said alkyl methacrylate being from 90/10 to 60/40.

7. The particulate modified vinyl chloride polymer of claim 5, wherein said alkyl methacrylate is added to the polymerization system at the time when the polymerization conversion of the fatty acid vinyl ester is from 50 to 90% by weight.

* * * * *